(12) United States Patent
Itoh

(10) Patent No.: US 7,602,600 B1
(45) Date of Patent: Oct. 13, 2009

(54) TANTALUM CAPACITOR

(75) Inventor: Masayuki Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/277,947

(22) Filed: Nov. 25, 2008

(30) Foreign Application Priority Data

Mar. 18, 2008 (JP) ............................. 2008-069359

(51) Int. Cl.
*H01G 4/005* (2006.01)
*H01G 4/38* (2006.01)

(52) U.S. Cl. ........................ 361/303; 361/307; 361/330; 29/25.42

(58) Field of Classification Search ................. 361/303, 361/307, 330; 29/25.42
See application file for complete search history.

(56) References Cited

U.S. PATENT DOCUMENTS

| | | | |
|---|---|---|---|
| 4,916,576 A * | 4/1990 | Herbert et al. | ............... 361/734 |
| 5,412,533 A * | 5/1995 | Murayama et al. | ........... 361/528 |
| 6,219,224 B1 * | 4/2001 | Honda | ......................... 361/537 |
| 7,193,840 B2 * | 3/2007 | Ohtsu | ......................... 361/541 |

FOREIGN PATENT DOCUMENTS

| JP | 2002-237431 A | 8/2002 |
|---|---|---|
| JP | 2003-332173 A | 11/2003 |
| JP | 2005-101279 A | 4/2005 |

* cited by examiner

*Primary Examiner*—Evan Pert
(74) *Attorney, Agent, or Firm*—Westerman, Hattori, Daniels & Adrian, LLP.

(57) ABSTRACT

A tantalum capacitor includes: sintered bodies which are disposed at intervals and respectively have first surfaces forming the same surface; and electrode rods which respectively extend into the tantalum sintered bodies and project from the first surfaces of the tantalum sintered bodies. The tantalum capacitor further includes: layers composed of an oxide film layer, a functional polymer layer or a manganese layer, and a carbon layer which are sequentially laminated on surfaces of each of the tantalum sintered bodies excluding the first surface; a conductive layer which covers outside surfaces of the tantalum sintered bodies excluding the first surfaces; and an electrode plate having openings respectively formed at positions corresponding to the first surfaces of the tantalum sintered bodies so that the electrode rods are exposed through the openings. The electrode plate is connected to the conductive layer and spreads across the first surfaces of the tantalum sintered bodies.

8 Claims, 10 Drawing Sheets

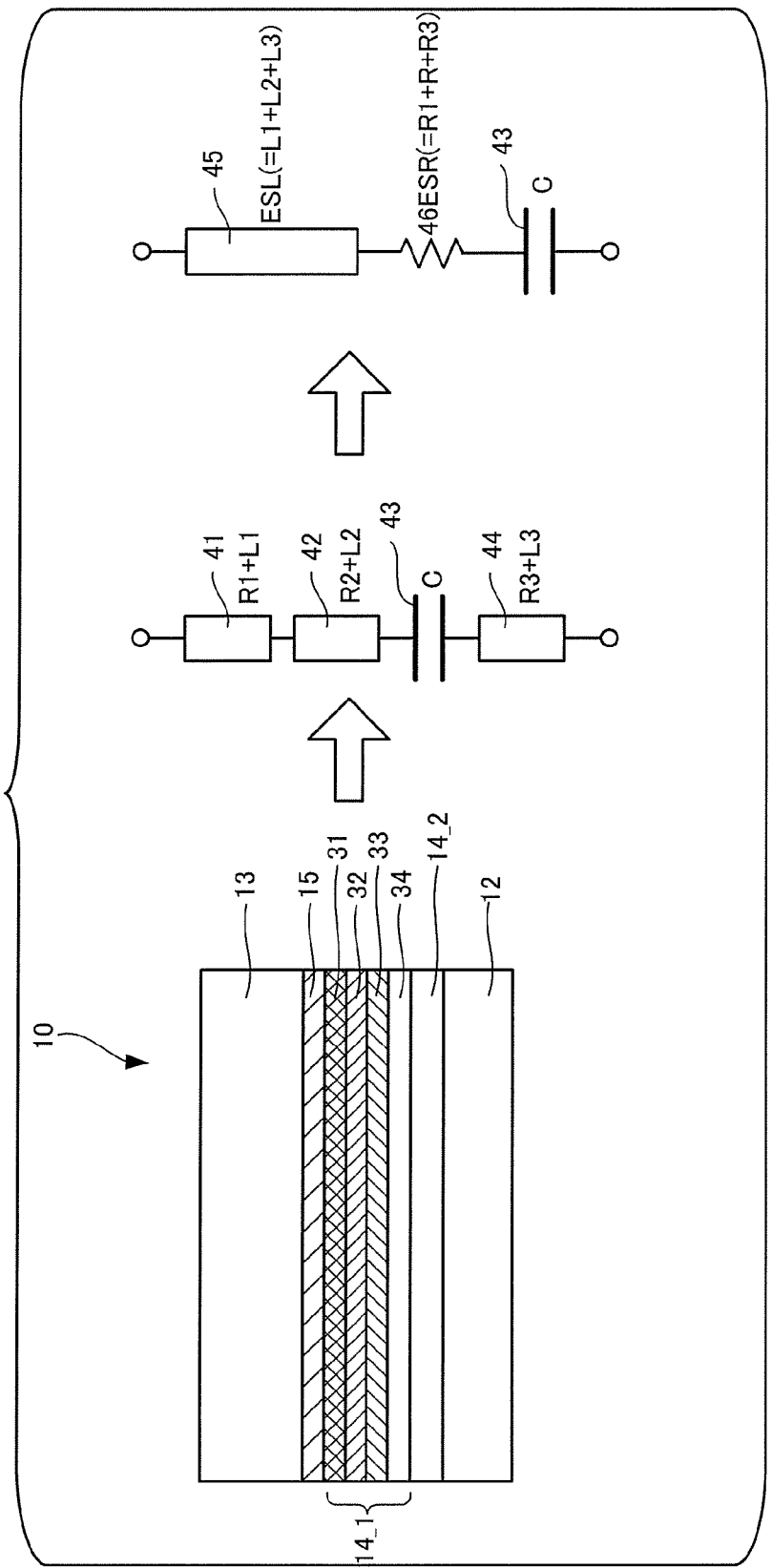

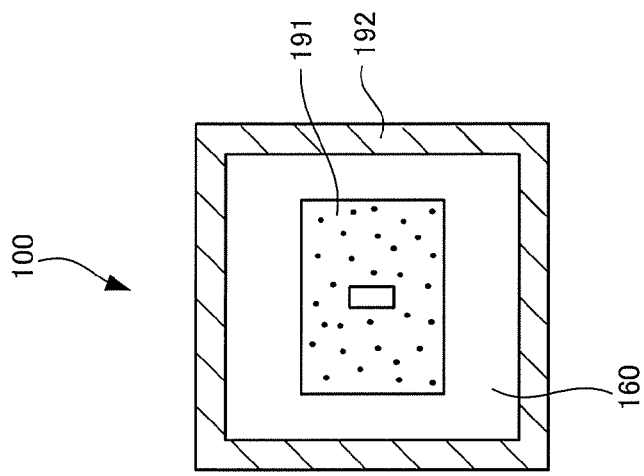
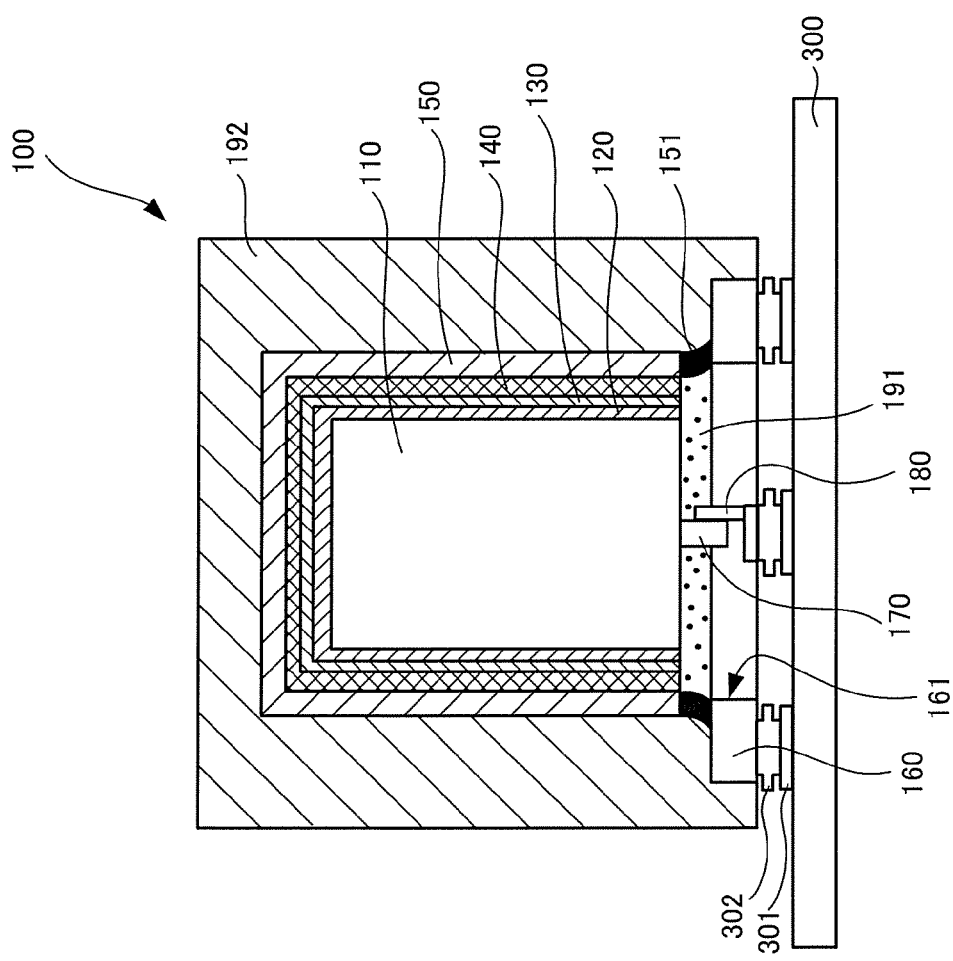
FIG. 4B
FIG. 4A

TANTALUM CAPACITOR

CROSS-REFERENCE TO RELATED APPLICATION

This application is based upon and claims the benefit of priority of the prior Japanese Patent Application No. 2008-069359, filed on Mar. 18, 2008, the entire contents of which are incorporated herein by reference.

FIELD

The embodiments discussed herein are related to a tantalum capacitor having a tantalum sintered body and a manufacturing method of the tantalum capacitor.

BACKGROUND

Conventionally, a power supply smoothing circuit is mounted on electronic equipment such as a personal computer to remove noise of a power supply voltage. Recently, as the size of electronic equipment is reduced and the operating speed thereof is increased rapidly, a tantalum capacitor the size of which is reduced and the capacitance of which is increased using a porous tantalum sintered body is widely used as a power supply smoothing circuit.

FIG. 1 is a schematic arrangement view of a tantalum capacitor 10, and FIG. 2 is a view illustrating a manufacturing method of the tantalum capacitor 10.

As illustrated in FIG. 1, the tantalum capacitor 10 is arranged such that a capacitor main body 14 is accommodated in a case 11 formed of a resin and the like, and an anode side lead frame 12 and a cathode side lead frame 13 which are connected to the capacitor main body 14 extend outside the case 11. Further, the capacitor main body 14 is composed of an internal element 14_1 having a tantalum sintered body and an anode rod 14_2, which projects from the internal element 14_1 and acts as the anode of the tantalum capacitor 10, and a conductive adhesive agent (silver and the like) applied to the internal element 14_1 forms a cathode layer 15 of the tantalum capacitor When the tantalum capacitor 10 is manufactured, first, the anode side lead frame 12 is bonded to the anode rod 14_2 of the capacitor main body 14, and the cathode layer 15 is applied to the cathode side lead frame 13 (step S1 of FIG. 2).

Subsequently, the capacitor main body 14 is bonded to the cathode side lead frame 13 through the cathode layer 15, and they are accommodated in the case 11 (step S2 of FIG. 2).

Further, the anode side lead frame 12 and the cathode side lead frame 13 are bended (step S3 of FIG. 2) and disposed on the same surface (step S4 of FIG. 2).

Further, as illustrated in FIG. 1, the tantalum capacitor 10 is connected to a print substrate 20 in such a manner that the anode side lead frame 12 connected to the anode rod 14_2 and the cathode side lead frame 13 connected to the cathode layer 15 are fixed to an electronic component 21 by a solder 22.

FIG. 3 is a view illustrating the relation between a layer structure of the tantalum capacitor 10 and a resistance component thereof.

A tantalum sintered body 34, an oxide film 33, a functional polymer layer 32 (or manganese layer), and a carbon layer 31 are sequentially laminated on the internal element 14_1 of the tantalum capacitor 10. Further, a conductive adhesive agent, which acts as the cathode layer 15, is applied to the outside surfaces of the internal element 14_1. The cathode side lead frame 13 is connected to the cathode layer 15, and the anode rod 14_2 is inserted in the tantalum sintered body 34. The anode side lead frame 12 is connected to the anode rod 14_2. The tantalum capacitor 10 is equivalent to a circuit composed of: a resistance component 41 (R1+L1) of the cathode side lead frame 13; a resistance component 42 (R2+L2) that results from the oxide film 33, the functional polymer layer 32, the carbon layer 31, the tantalum sintered body 34, and the cathode layer 15; a capacitor component 43 (C) that results from the tantalum sintered body 34; and a resistance component 44 (R3+L3) that results from the anode rod 14_2 and the anode side lead frame 12. The resistance component 42, the resistance component 42, the capacitor component 43 (C) and the resistance component 44 are connected to each other in series. That is, the tantalum capacitor 10 is equivalent to the circuit in which an equivalent series resister 45 (ESL: L1+L2+L3), an equivalent series inductance 46 (ESR: R1+R2+R3), and a capacitor component 43 (C) are connected to each other in series.

Here, as illustrated in FIG. 1, there is a problem in that since the length of the tantalum capacitor 10 is increased by that the cathode side lead frame 13 and the anode side lead frame 12 are bent, the high frequency characteristics thereof are deteriorated by an increase of the ESL 45 and the ESR 46. In particular, recently, as the operation speed of electronic equipment is increased, a power supply frequency is increased, from which it is strongly requested to maintain a stable performance even in a high frequency region.

As to this point, Japanese Laid-open Patent Publication Nos. 2005-101279 and 2002-237431 disclose a technique for forming a cathode and an anode on the same surface of a capacitor by interposing an insulating layer between a tantalum sintered body and a cathode layer, and Japanese Laid-open Patent Publication No. 2003-332173 discloses a technique for increasing a current path by disposing anodes and a cathode across an insulation layer. It is possible to improve high frequency characteristics by reducing the ESL and the ESR making use of these techniques.

However, in the techniques disclosed in Japanese Laid-open Patent Publication Nos. 2005-101279, 2002-237431, and 2003-332173, it is necessary to surround the tantalum sintered body and the anode by the insulation layer, from which a problem arises in that the size of the overall capacitor is increased. Further, the techniques disclosed in Japanese Laid-open Patent Publication Nos. 2005-101279, 2002-237431, and 2003-332173 are disadvantageous in that since the shape and the structure of a layer are complex, a manufacturing process is complicated and a manufacturing cost is increased.

SUMMARY

According to an aspect of the present invention, a tantalum capacitor includes:

a plurality of tantalum sintered bodies which are disposed at intervals and respectively have first surfaces that form the same surface;

a plurality of electrode rods which respectively extend into the plurality of tantalum sintered bodies and project from the first surfaces of the tantalum sintered bodies;

a plurality of layers composed of an oxide film layer, a functional polymer layer or a manganese layer, and a carbon layer which are sequentially laminated on surfaces of each of the plurality of tantalum sintered bodies excluding the first surface;

a conductive layer which covers outside surfaces of the plurality of tantalum sintered bodies excluding the first surfaces; and an electrode plate having openings which are respectively formed at positions corresponding to the first surfaces of the plurality of tantalum sintered bodies so that the electrode rods are exposed through the openings, the electrode plate being connected to the conductive layer so as to spread across the first surfaces of the plurality of tantalum sintered bodies.

Objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 3 is a view illustrating the relation between a layer structure of the tantalum capacitor and a resistance component thereof;

FIG. 4A and FIG. 4B are views illustrating a first embodiment of the tantalum capacitor;

DESCRIPTION OF EMBODIMENT(S)

Figure 1:
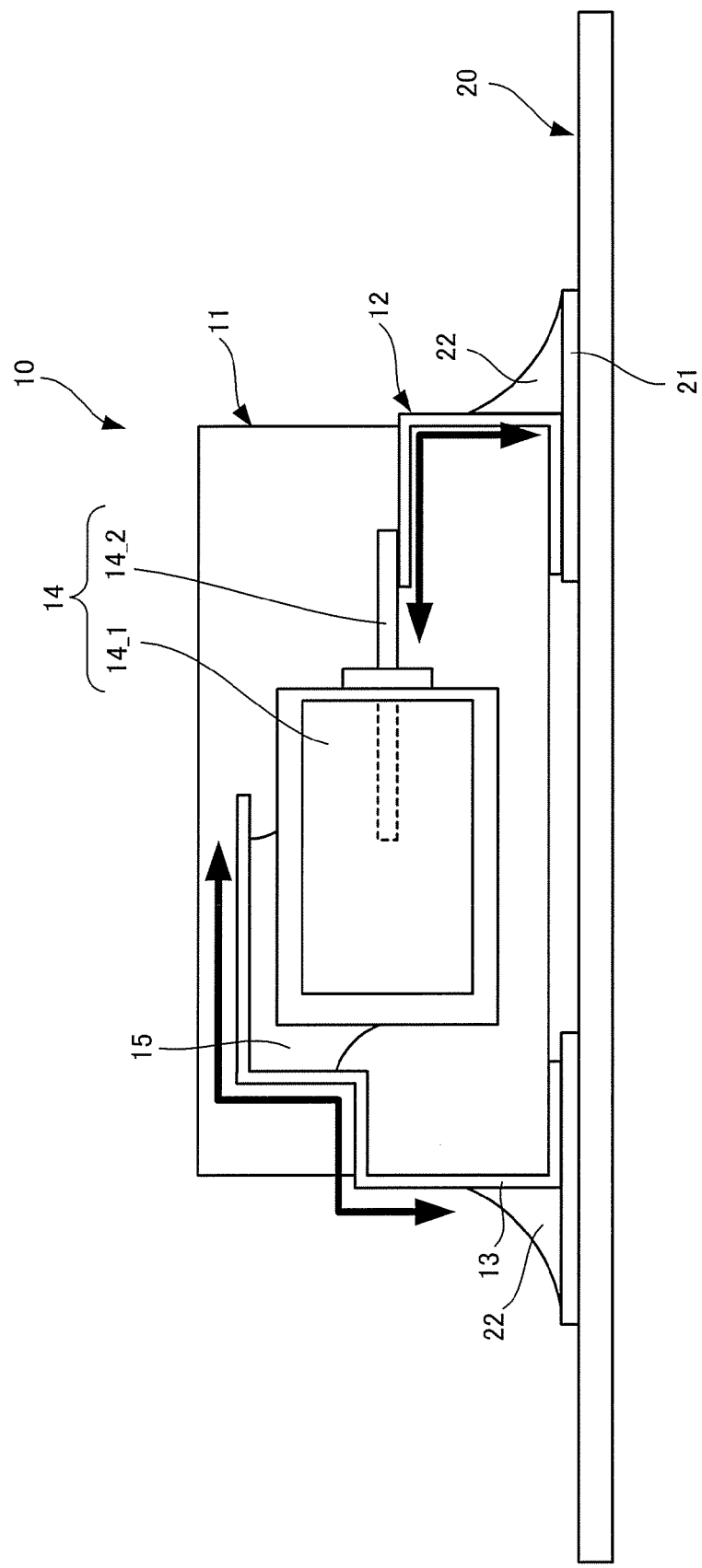
FIG. 1 is a schematic arrangement view of a tantalum capacitor.
Figure 2:
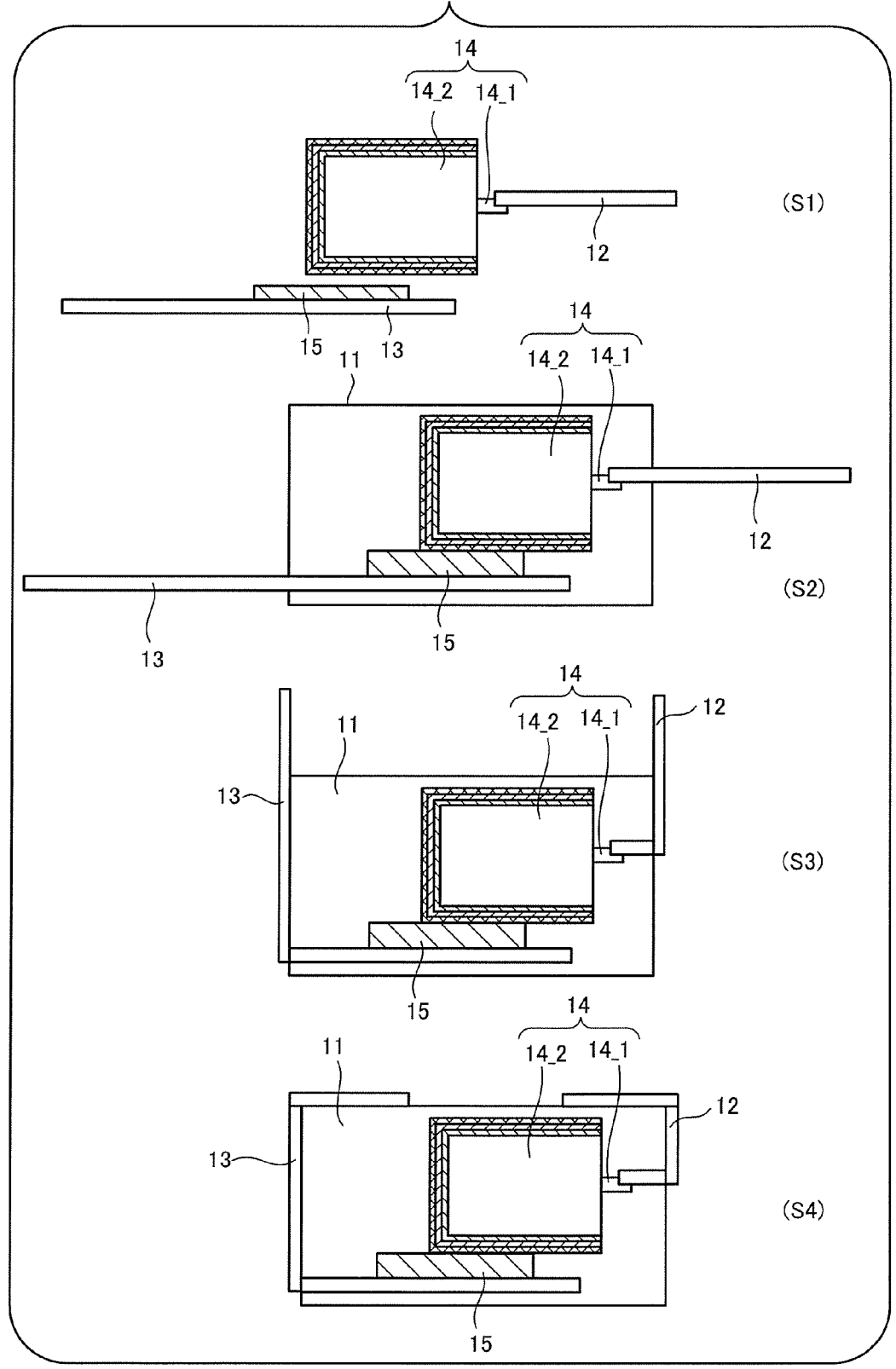
FIG. 2 is a view illustrating a manufacturing method of the tantalum capacitor.

Specific embodiments will be described below referring to the drawings.

FIG. 4A and FIG. 4B are views illustrating a first embodiment of the tantalum capacitor.

The tantalum capacitor of the embodiment has tantalum sintered bodies. FIG. 4A illustrates a side surface of one of the tantalum sintered bodies, and FIG. 4B illustrates a surface of the one tantalum sintered body on which an anode and a cathode are disposed.

As illustrated in FIG. 4A, the tantalum capacitor 100 is arranged such that an anode tantalum rod 170 projects from a tantalum sintered body 110, and an oxide film layer 120, a functional polymer layer 130, a carbon layer 140, and a silver layer 150 are sequentially laminated on the outside surface of the tantalum sintered body 110 excluding the surface (herein after, this surface is called a terminal surface) from which the anode tantalum rod 170 projects. Further, the tantalum sintered body 110 is covered with an external resin 192. The tantalum sintered body 110 corresponds to an example of a tantalum sintered body in the embodiment, and the anode tantalum rod 170 corresponds to an example of an electrode rod in the embodiment. Further, the oxide layer 120 corresponds to an example of an oxide film layer in the embodiment, the functional polymer layer 130 corresponds to an example of a functional polymer layer in the embodiment, the carbon layer 140 corresponds to an example of a carbon layer in the embodiment, and the silver layer 150 corresponds to an example of a conductive layer in the embodiment.

An electrode plate 160, which is connected to the silver layer 150 by a solder 151, is disposed on the terminal surface of the tantalum sintered body 110. A through hole 161, through which an anode terminal 180 connected to the anode tantalum rods 170 passes, is formed in the electrode plate 160, and the gap between the tantalum sintered bodies 110 and the electrode plate 160 is filled with an internal resin 191. The electrode plate 160 corresponds to an example of an electrode plate in the embodiment.

The tantalum capacitor 100 is arranged such that the electrode plate 160 acting as the cathode and the anode terminal 180 acting as the anode are connected to an electronic component 302 on a print substrate 300 by a solder 301. In this embodiment, since the electrode plate 160 and the anode terminal 180 are formed on the same surface, a current path is shortened and thus the ESL and the ESR of the overall tantalum capacitor 100 can be reduced, thereby high frequency characteristics can be improved.

Figure 5:
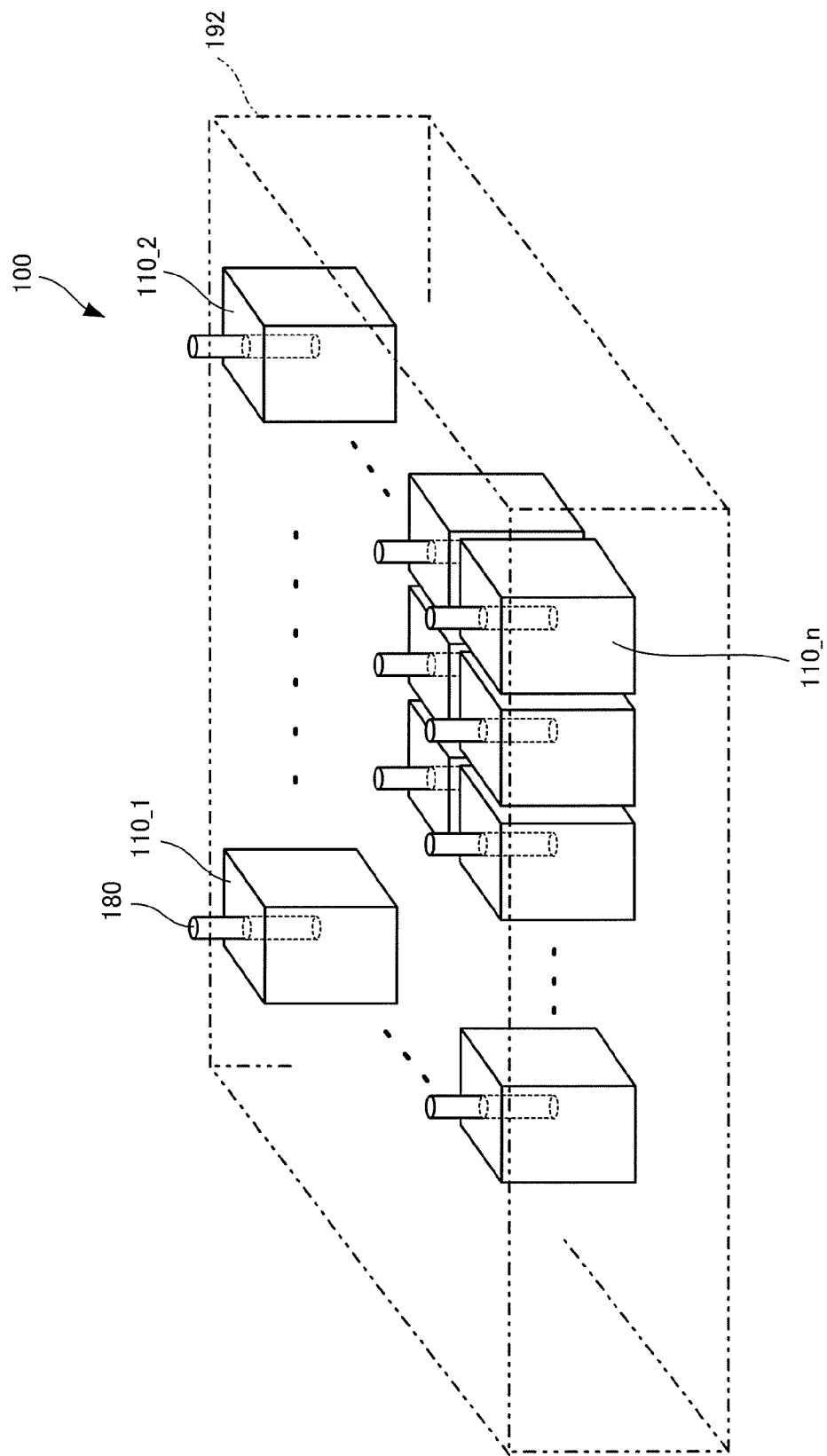
FIG. 5 is a transparent perspective view of the tantalum capacitor having tantalum sintered bodies.
Figure 6:
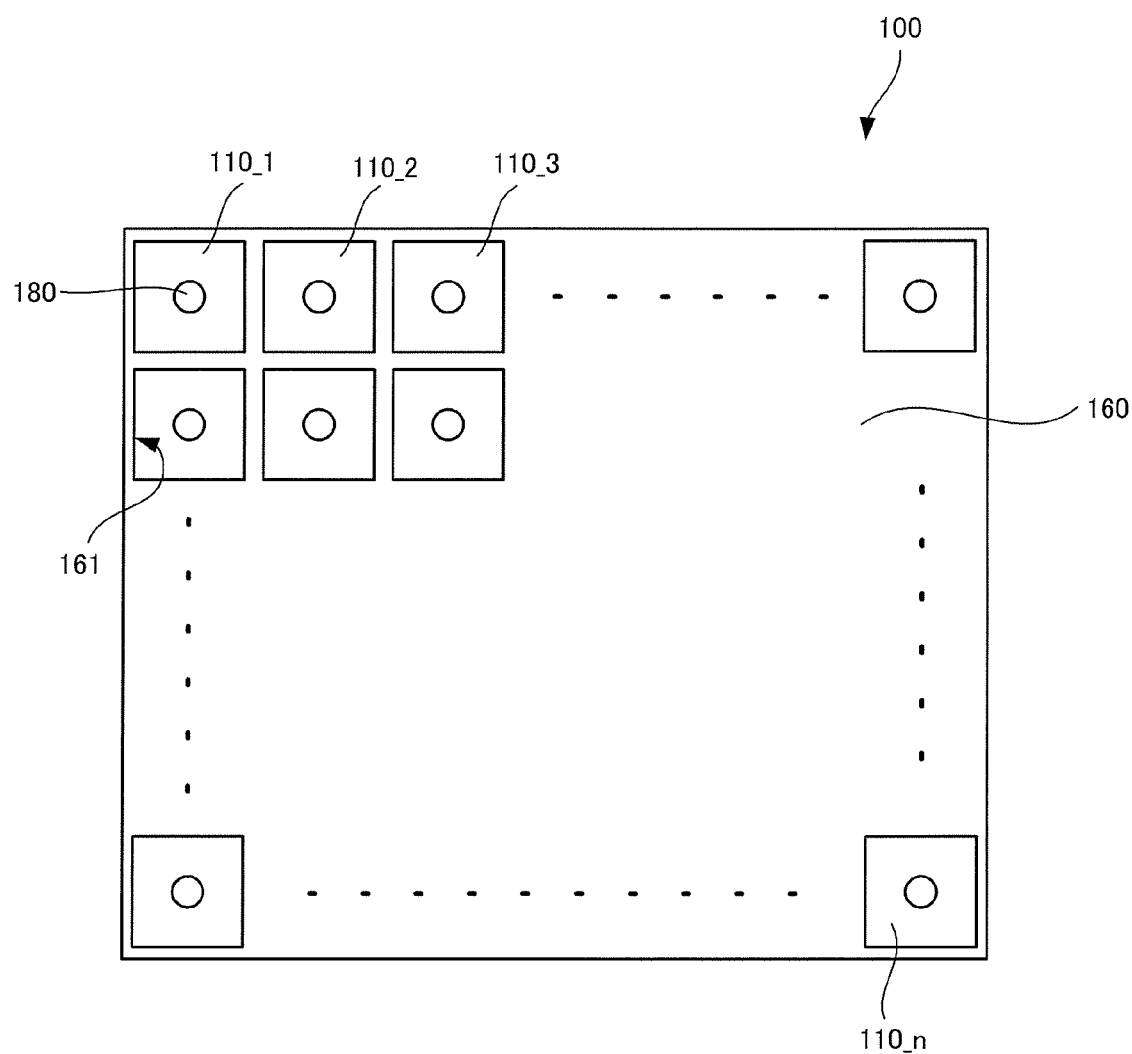
FIG. 6 is a view illustrating terminal surfaces of the tantalum capacitor.

FIG. 5 is a transparent perspective view of the tantalum capacitor 100 having tantalum sintered bodies 110, and FIG. 6 is a view illustrating the terminal surfaces of the tantalum capacitor 100.

As illustrated in FIG. 5, the tantalum capacitor 100 is arranged such that the external resin 192 forms a case of the tantalum capacitor 100, tantalum sintered bodies 110_1, 110_2, . . . , and 110_n are disposed in the case at intervals with the anode terminals 180 thereof facing to the same side. Further, as illustrated in FIG. 6, the electrode plate 160 have through holes 161 formed in correspondence to the anode terminals 180 of the respective tantalum sintered bodies 110_1, 110_2, . . . , and 110_n. The anode terminals 180 share the electrode plate 160 acting as the cathode in the tantalum capacitor 100. Since the anodes and the wide surface-shaped cathode are disposed in the tantalum capacitor 100, the current path can be increased.

Figure 7:
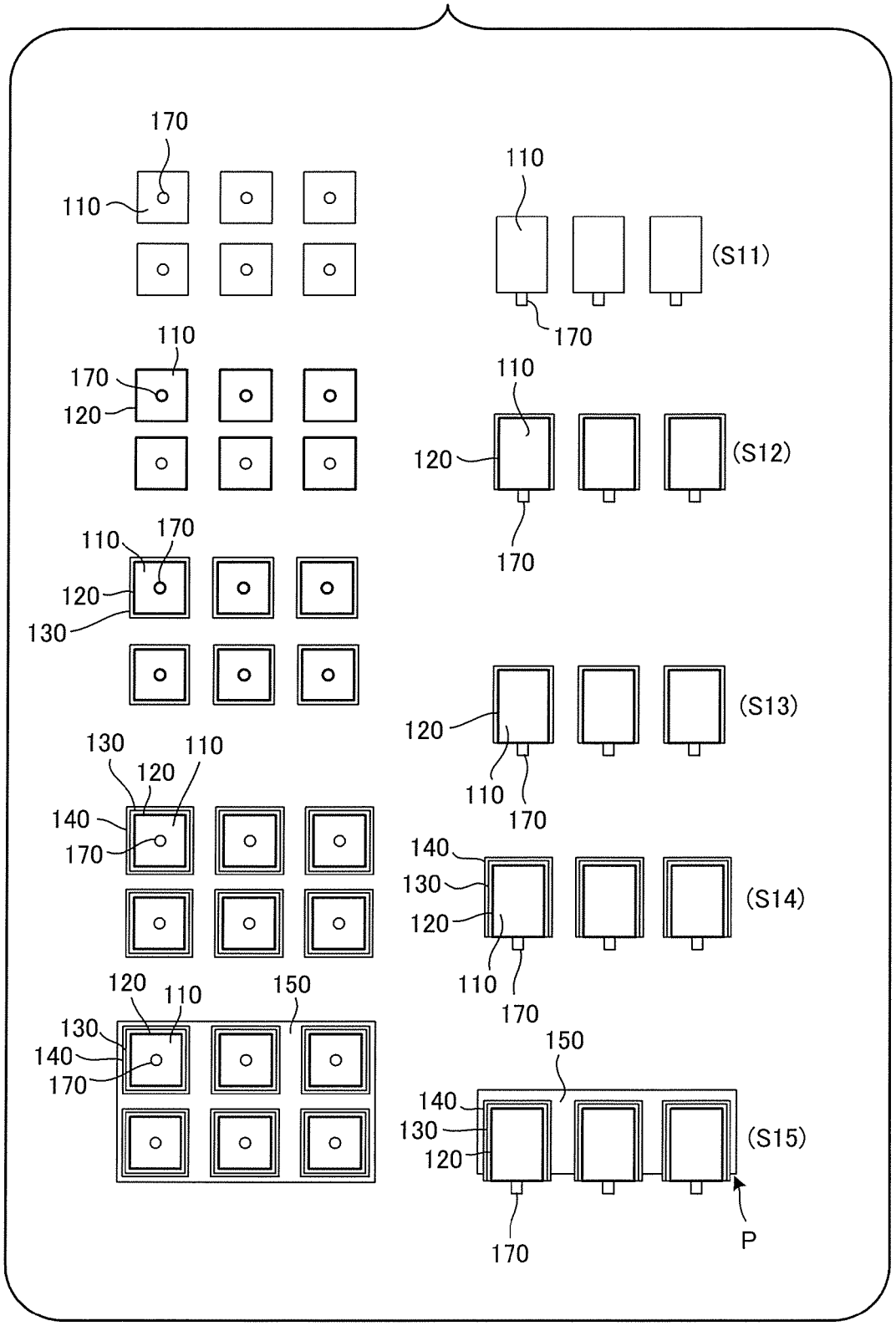
FIG. 7 is a view illustrating a manufacturing process before a cathode and anodes of the tantalum capacitor are formed.

FIG. 7 is a view illustrating manufacturing process before the cathode and the anodes of the tantalum capacitor 100 are formed.

The terminal surfaces of products in the respective manufacturing process are illustrated on a left side of FIG. 7, and the side surfaces of the products in the respective manufacturing process are illustrated on a right side of FIG. 7.

When the tantalum capacitor 100 is manufactured, first, the anode tantalum rods 170 are inserted into the tantalum sintered bodies 110, and the tantalum sintered bodies 110 are disposed at intervals (step S11 of FIG. 7).

Subsequently, the oxide film layer 120 (step S12 of FIG. 7), the functional polymer layer 130 (step S13 of FIG. 7), and the carbon layer 140 (step S14 of FIG. 7) are sequentially laminated on the outside surfaces of the tantalum sintered bodies 110 excluding the terminal surfaces thereof.

Further, the gaps between the tantalum sintered bodies 110 are filled with a silver paste, and the silver paste is also applied to the outside surfaces of the tantalum sintered bodies 110 excluding the terminal surfaces thereof, thereby the silver layers 150 are formed (step S15 of FIG. 7). The manufacturing process can be simplified by integrally forming the silver layers 150 with respect to the tantalum sintered bodies 110.

Further, the silver layers 150 form recessed steps P on the terminal surfaces of the tantalum sintered bodies 110 to avoid a disadvantage such as a short circuit and the like.

As described above, when the oxide film layer 120, the functional polymer layer 130, the carbon layer 140, and the silver layer 150 are laminated on the tantalum sintered bodies 110, the cathode and the anodes of the tantalum capacitor 100 are formed.

Figure 8:
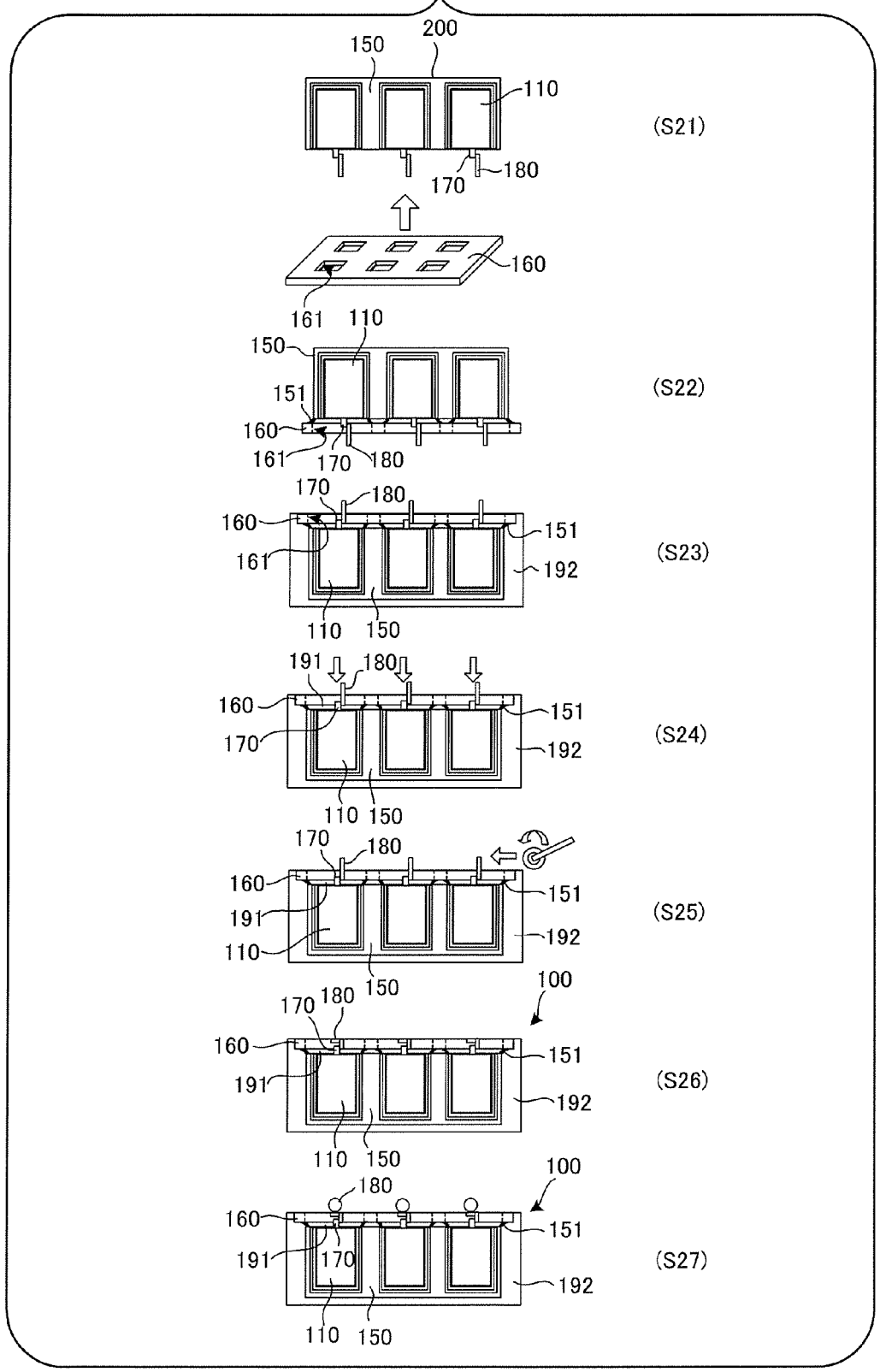
FIG. 8 is a view illustrating manufacturing process in which the cathode and the anodes of the tantalum capacitor are manufactured.

FIG. 8 is a view illustrating manufacturing process in which the cathode and the anodes of the tantalum capacitor 100 are formed.

First, a tantalum product 200, in which the anode tantalum rods 170 are integrated, and the electrode plate 160, in which the through holes 161 are formed, are prepared, and the anode terminals 180 are attached to the anode tantalum rods 170 by welding. Further, the electrode plate 160 is disposed on the terminal surface sides of the tantalum sintered bodies 110 so that the anode terminals 180 pass through the through holes 161 (step S21 of FIG. 8).

Subsequently, the cathode is formed by connecting the electrode plate 160 to the silver layer 150 by the solder 151 (step S22 of FIG. 8). In this state, a gap as large as the solder 151 sandwiched between the electrode plate 160 and the silver layer 150 is formed between the terminal surfaces of the tantalum sintered bodies 110 and the electrode plate 160.

Further, the surfaces outside the silver layers 150 of the tantalum sintered bodies 110 are covered with the external resin 192 (step S23 of FIG. 8), and the gaps between the terminal surfaces of the tantalum sintered bodies 110 and the electrode plate 160 are filled with the internal resin 191 by injecting the internal resin 191 from the through holes 161 of the electrode plate 160 (step S24 of FIG. 8). In this embodiment, since the tantalum sintered bodies 110 are insulated from the electrode plate 160 by the internal resin 191, the high frequency characteristics of the tantalum capacitor 100 can be improved by preventing a layer structure from becoming complicated and the tantalum capacitor 100 from becoming large in size.

As described above, when the electrode plate 160 acting as the cathode and the anode terminals 180 acting as the anodes are attached to the tantalum capacitor 100, the anode terminals 180 are subjected to a bending process (step S25 of FIG. 8), thereby the tantalum capacitor 100 is completed (step S26 of FIG. 8). Note that when the anode terminals 180 are subjected to a ball pump process at step 25, the tantalum capacitor 100 having a BGA structure is formed (step S27 of FIG. 8).

As described above, according to the tantalum capacitor 100 of this embodiment, the anodes and the cathode can be formed on the same surface by preventing the layer structure from becoming complicated and the tantalum capacitor 100 from becoming large in size, and the high frequency characteristics can be improved by reducing the ESL and the ESR of the capacitor.

The description of the first embodiment of the tantalum capacitor and the manufacturing method of the tantalum capacitor is finished, and, next, a second embodiment will be described. The second embodiment of a tantalum capacitor and a manufacturing method of the tantalum capacitor is different from the first embodiment in a laminated layer structure. Members which are the same as those of the first embodiment are denoted by the same reference numerals and the description thereof will be omitted, and only the points of the second embodiment which are different from those of the first embodiment will be described.

Figure 9:
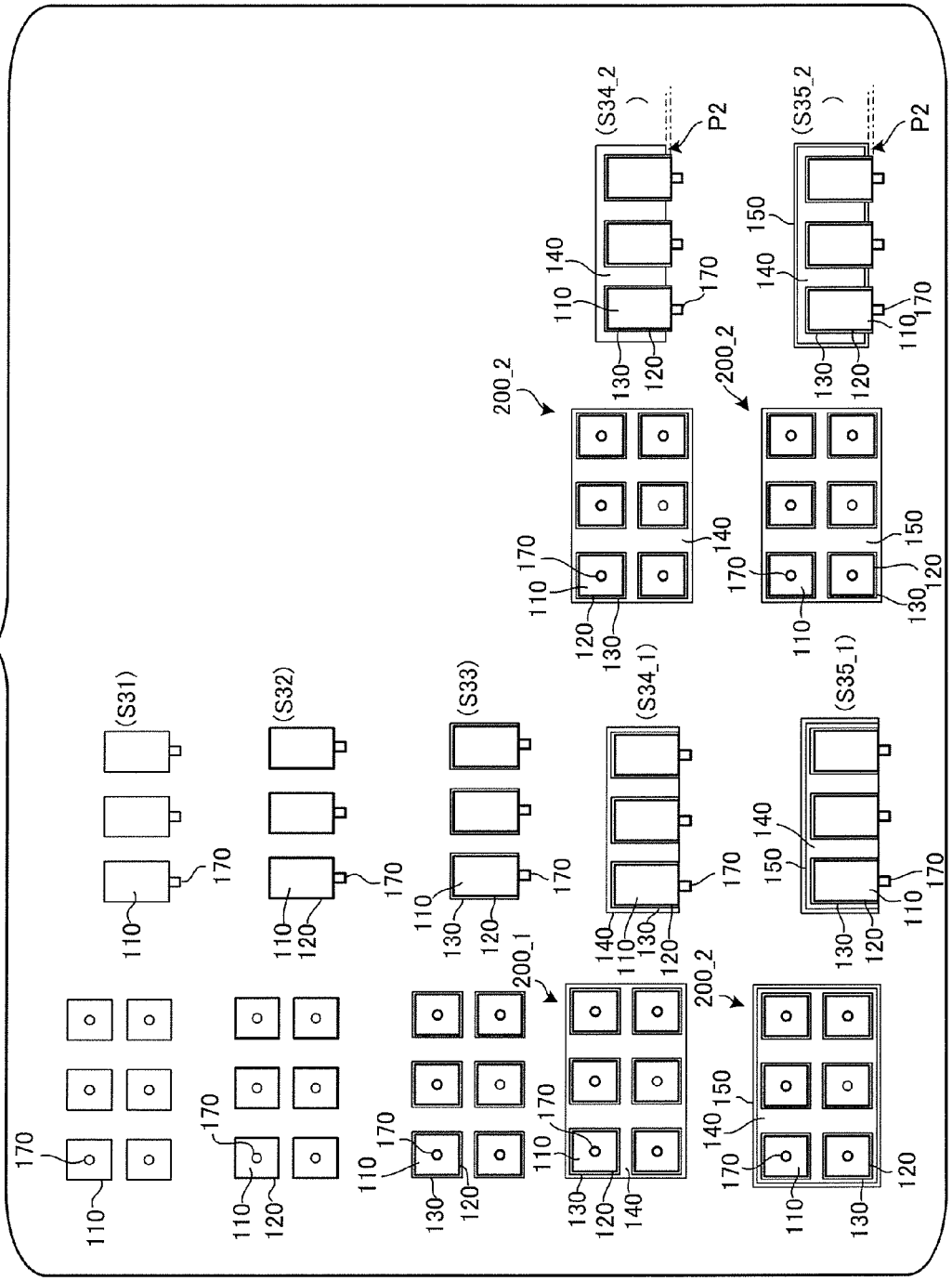
FIG. 9 is a view illustrating manufacturing process in which tantalum products are formed before a cathode and anodes are created in a tantalum capacitor of a second embodiment.

FIG. 9 is a view illustrating manufacturing process in which tantalum products 200_2 are formed before a cathode and anodes are created in a tantalum capacitor according to the second embodiment.

FIG. 9 illustrates terminal surfaces and the side surfaces of products in the respective manufacturing process.

First, in the tantalum capacitor of the second embodiment likewise the tantalum capacitor 100 of the first embodiment illustrated in FIG. 7, anode tantalum rods 170 are inserted into tantalum sintered bodies 110 (step S31 of FIG. 9), and an oxide film layer 120 (step S32 of FIG. 9) and a functional polymer layer 130 (step S33 of FIG. 9) are sequentially laminated on the outside surfaces of the tantalum sintered bodies 110 excluding the terminal surfaces thereof.

In the tantalum capacitor 100 of the first embodiment illustrated in FIG. 7, the carbon layer 140 is laminated on the outside surfaces of the tantalum sintered bodies 110 excluding the terminal surfaces thereof. However, in the tantalum capacitor of the second embodiment, since a carbon layer 140 is formed together in the gaps between the tantalum sintered bodies 110 and on the outside surfaces of the tantalum sintered bodies 110 excluding the terminal surfaces thereof, the tantalum product 200_2 is created as an integral body (step S34_1 of FIG. 9).

Further, a silver layer 150 is formed on the outside surface of the tantalum product 200_2 excluding the terminal surface thereof, the tantalum product 200_2 being integrated by forming the carbon layer 140 (step S35_1 of FIG. 9).

The tantalum capacitor is created by forming a cathode and anodes according to FIG. 8 based on the tantalum product 200_2 created as described above.

As described above, according to the tantalum capacitor of the present embodiment, since the carbon layer 140 and the silver layer 150 can be laminated on the tantalum sintered bodies 110 integrally therewith, the manufacturing process can be more effectively simplified.

Further, when the carbon layer 140 is laminated, recessed steps P2 may be formed on the terminal surfaces of the tantalum sintered bodies 110 (step S34_2 of FIG. 9), and the silver layer 150 may be applied to the section of the terminal surface of the tantalum product 200_2 excluding the sections thereof corresponding to the tantalum sintered bodies 110 in addition to the outside surface of the tantalum product 200_2 (step S35_2 of FIG. 9). When the steps P2 are formed, a short circuit and the like can be avoided by preventing silver layers 150 from coming into contact with the tantalum sintered bodies 110. Further, when the silver layer 150 is also applied to a part of terminal surface of the tantalum product 200_2, since an electrode plate 160 can be connected to the silver layer 150 on a wide surface, energization property can be improved at step S21 of FIG. 8.

This concludes the description of the second embodiment of the tantalum capacitor and the manufacturing method of the tantalum capacitor and next, a third embodiment will be described. The third embodiment of the tantalum capacitor and the manufacturing method of the tantalum capacitor is different from those of the first and second embodiments in a laminated structure. Members which are the same as those of the first and second embodiments are denoted by the same reference numerals and the description thereof will be omitted, and only the points of the third embodiment which are different from those of the first and second embodiments will be described.

Figure 10:
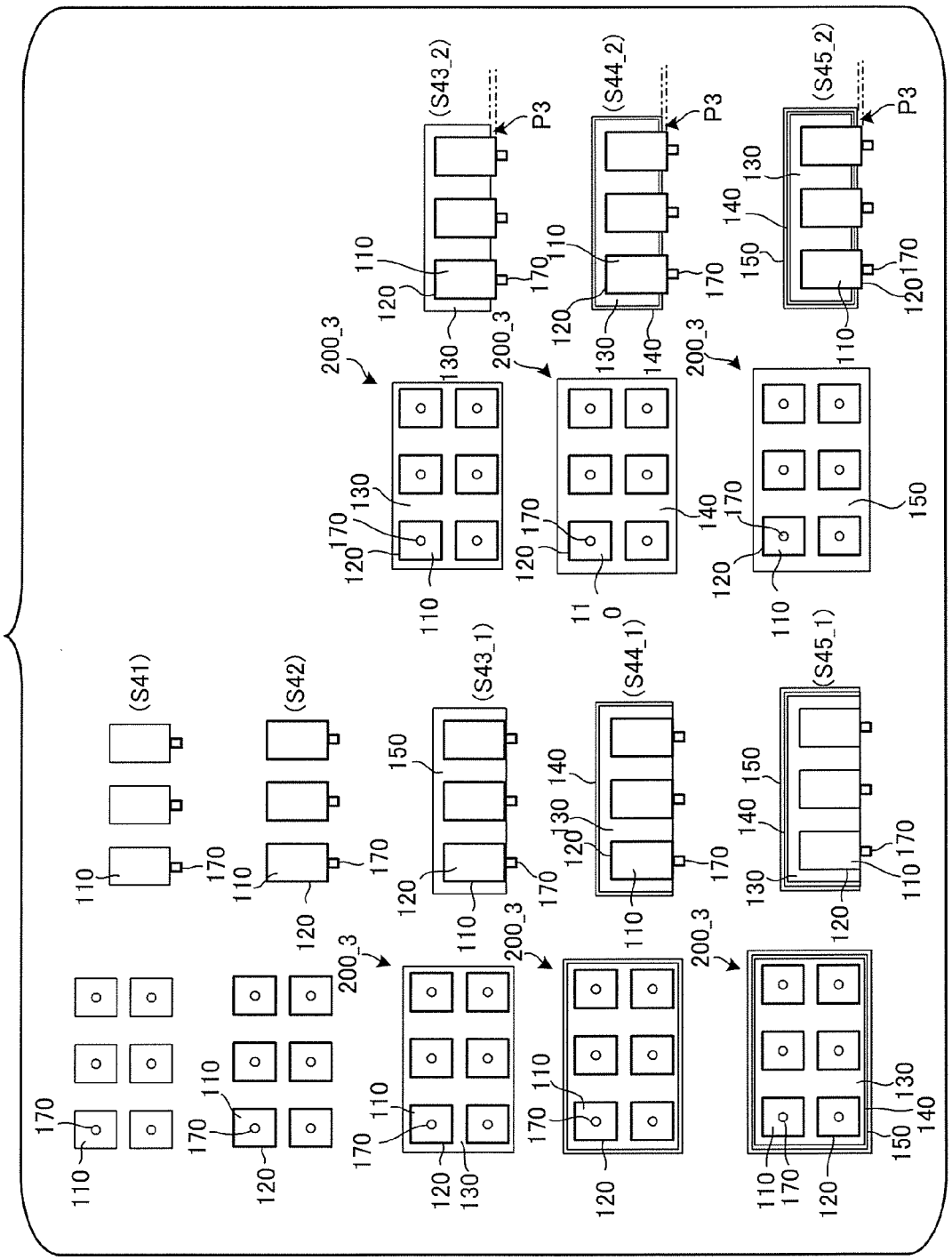
FIG. 10 is a view illustrating manufacturing process in which tantalum products are formed before a cathode and anodes are created in a tantalum capacitor of a third embodiment.

FIG. 10 is a view illustrating manufacturing process in which tantalum products 200_3 are formed before a cathode and anodes are created in a tantalum capacitor of the third embodiment.

FIG. 10 illustrates the terminal surfaces and the side surfaces of products in the respective manufacturing process.

First, in the tantalum capacitor of the third embodiment likewise the tantalum capacitor 100 of the first embodiment illustrated in FIG. 7, anode tantalum rods 170 are inserted into tantalum sintered bodies 110 (step S41 of FIG. 10), and an oxide film layer 120 is laminated on the outside surfaces of the tantalum sintered bodies 110 excluding the terminal surfaces thereof (step S42 of FIG. 10).

In the tantalum capacitor of the third embodiment, when a functional polymer layer 130 is formed, a tantalum product 200_2 is formed by integrating tantalum sintered bodies 110. The tantalum sintered bodies 110 on which the oxide film layer 120 is laminated are disposed at intervals, and the functional polymer layer 130 is laminated between the tantalum sintered bodies 110 and on the outside surfaces of the tantalum sintered bodies 110 excluding the terminal surfaces thereof (step S43_1 of FIG. 10).

Subsequently, a carbon layer 140 is laminated on the outside surface of the tantalum product 200_3 excluding the terminal surface thereof (step S44_1 of FIG. 10), and further a silver layer 150 is laminated thereon (step S45_1 of FIG. 10). The cathode and the anodes are formed to the tantalum product 200_3 created described above according to FIG. 8, thereby the tantalum capacitor is created.

As described above, according to the tantalum capacitor of the third embodiment, a troublesome work for individually forming a functional polymer layer 130, a carbon layer 140, and a silver layer 150 for each of the tantalum sintered bodies 110 can be omitted.

Further, when the functional polymer layer 130 is laminated, recessed steps P3 may be formed to the terminal surfaces of the tantalum sintered bodies 110 (step S43_2 of FIG. 10), and the carbon layer 140 and the silver layer 150 may be sequentially applied to the terminal surfaces of the tantalum products 200_3 excluding the sections thereof corresponding to the tantalum sintered bodies 110 in addition to the outside surface of the tantalum product 200_3 (step S44_2, S45_2 of FIG. 10).

Here, although the examples, in which the functional polymer layer is formed between the oxide film layer and the carbon layer, are described, a manganese layer may be formed there between.

In the above-described embodiments of the tantalum capacitor, a conductive layer covers the surfaces of tantalum sintered bodies excluding the first surfaces thereof, and an electrode plate, which has openings formed on the positions corresponding to electrode rods projecting from the tantalum sintered bodies, are connected to the conductive layer. Accordingly, since electrode rods acting as nodes and the electrode plate acting as a cathode can be formed on the same surface without disposing a complex insulation layer for covering the overall tantalum sintered bodies, it is possible to suppress an increase of a capacitor and to reduce an ESL and an ESR. Further, according to the embodiments of the tantalum capacitor, a tantalum capacitor having anodes can be easily manufactured, and it is possible to suppress that a manufacturing process be complicated and a manufacturing cost be increased by laminating the conductive layer on the outside surfaces of the tantalum capacitors excluding the first surfaces thereof and connecting the electrode plate to the first surface side of the tantalum capacitors.

As described above, according to the embodiments of the tantalum capacitor and the manufacturing method of the tantalum capacitor, a compact tantalum capacitor in high frequency performance can be provided.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A tantalum capacitor comprising:
    a plurality of tantalum sintered bodies which are disposed at intervals and respectively have first surfaces that form a terminal surface;
    a plurality of electrode rods which respectively extend into the plurality of tantalum sintered bodies and project from the first surfaces of the tantalum sintered bodies;
    a plurality of layers composed of an oxide film layer, a functional polymer layer or a manganese layer, and a carbon layer which are sequentially laminated on surfaces of each of the plurality of tantalum sintered bodies excluding the first surfaces;
    a conductive layer which covers outside surfaces of the plurality of tantalum sintered bodies excluding the first surfaces; and
    an electrode plate having openings which are respectively formed at positions corresponding to the first surfaces of the plurality of tantalum sintered bodies so that the electrode rods are exposed through the openings, the electrode plate being connected to the conductive layer so as to spread across the first surfaces of the plurality of tantalum sintered bodies.

2. The tantalum capacitor according to claim 1, wherein the conductive layer covers the sections on the first surfaces of the plurality of tantalum sintered bodies excluding the sections thereof corresponding to the openings of the electrode plate.

3. The tantalum capacitor according to claim 1, wherein the conductive layer has recessed sections recessed with respect to the first surfaces of the plurality of tantalum sintered bodies.

4. The tantalum capacitor according to claim 1, wherein a resin layer is formed on the first surfaces of the plurality of tantalum sintered bodies, corresponding to the openings of the electrode plate.

5. A manufacturing method of a tantalum capacitor comprising:
    disposing a plurality of tantalum sintered bodies at intervals so that the first surfaces of the tantalum sintered bodies form a terminal surface;
    forming a plurality of electrode rods which extend in the plurality of tantalum sintered bodies and project from the first surfaces of the tantalum sintered bodies;
    sequentially laminating an oxide film layer, a functional polymer layer or a manganese layer, and a carbon layer on surfaces of each of the plurality of tantalum sintered bodies excluding the first surfaces;
    forming a conductive layer which covers outside surfaces of the plurality of tantalum sintered bodies excluding the first surfaces; and
    connecting, to the conductive layer, an electrode plate having openings which are formed at positions corresponding to the first surfaces of the plurality of tantalum sintered bodies so that the electrode rods are exposed through the openings, the electrode plate spreading across the first surfaces of the plurality of tantalum sintered bodies.

6. The manufacturing method of the tantalum capacitor according to claim 5, wherein the laminating is a step of sequentially laminating the oxide film layer, the functional polymer layer or the manganese layer, and the carbon layer on the surfaces of each of the plurality of tantalum sintered bodies excluding the respective first surface; and the forming a conductive layer is a step of filling the gaps between the plurality of tantalum sintered bodies with the conductive layer, and covering the surfaces excluding the first surfaces with the conductive layer.

7. The manufacturing method of the tantalum capacitor according to claim 5, wherein the laminating comprises:

a first step of creating a plurality of first created bodies by sequentially laminating the oxide film layer, the functional polymer layer or the manganese layer on the surfaces of each of the plurality of tantalum sintered bodies excluding the respective first surface and; and a second step of filling the gaps between the plurality of first created bodies with the carbon layer, and covering the surfaces excluding the first surfaces with the carbon layer.

8. The manufacturing method of the tantalum capacitor according to claim 5, wherein the laminating comprises:

a third step of creating a plurality of second created bodies by laminating the oxide film layer on the surfaces of each of the plurality of tantalum sintered bodies excluding the respective first surface and;

a fourth step of creating a third created body by filling the gaps between the plurality of second created bodies with the functional polymer layer or the manganese layer and covering the surfaces excluding the first surfaces with the functional polymer layer or the manganese layer; and a fifth step of laminating the carbon layer on a surface of the third created body excluding the first surfaces.

* * * * *